May 21, 1935.  G. A. LYON  2,001,969
ONE-PIECE ARCUATE TIRE COVER
Filed Jan. 2, 1932  3 Sheets-Sheet 1
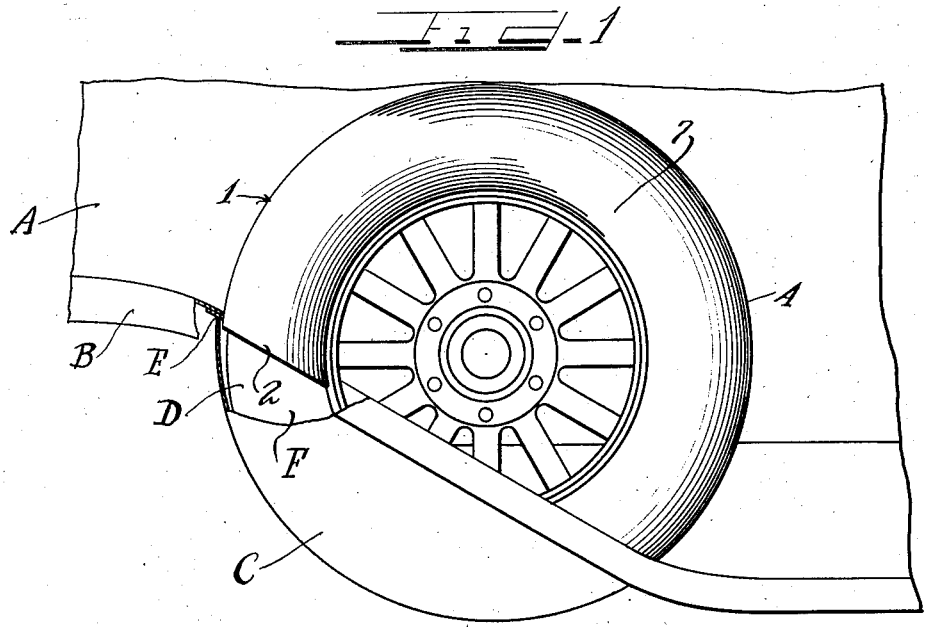
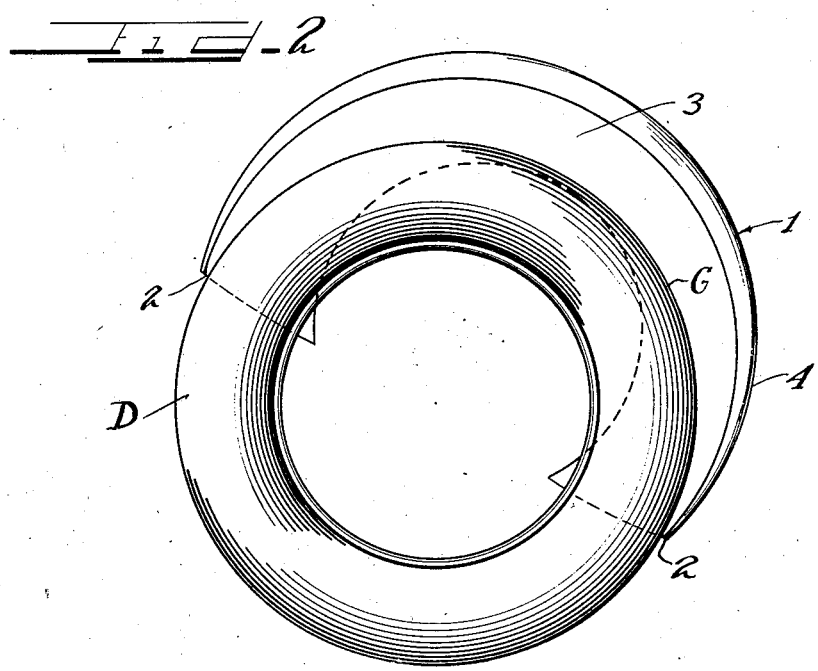
George Albert Lyon.

May 21, 1935.   G. A. LYON   2,001,969
ONE-PIECE ARCUATE TIRE COVER
Filed Jan. 2, 1932   3 Sheets-Sheet 2
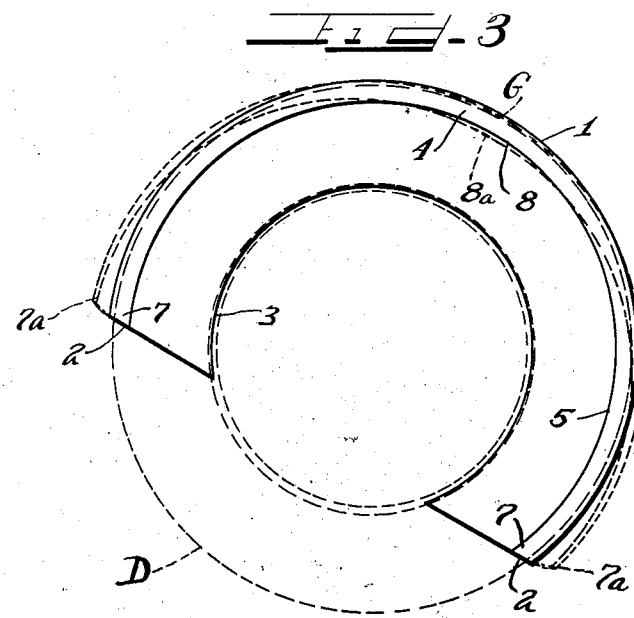
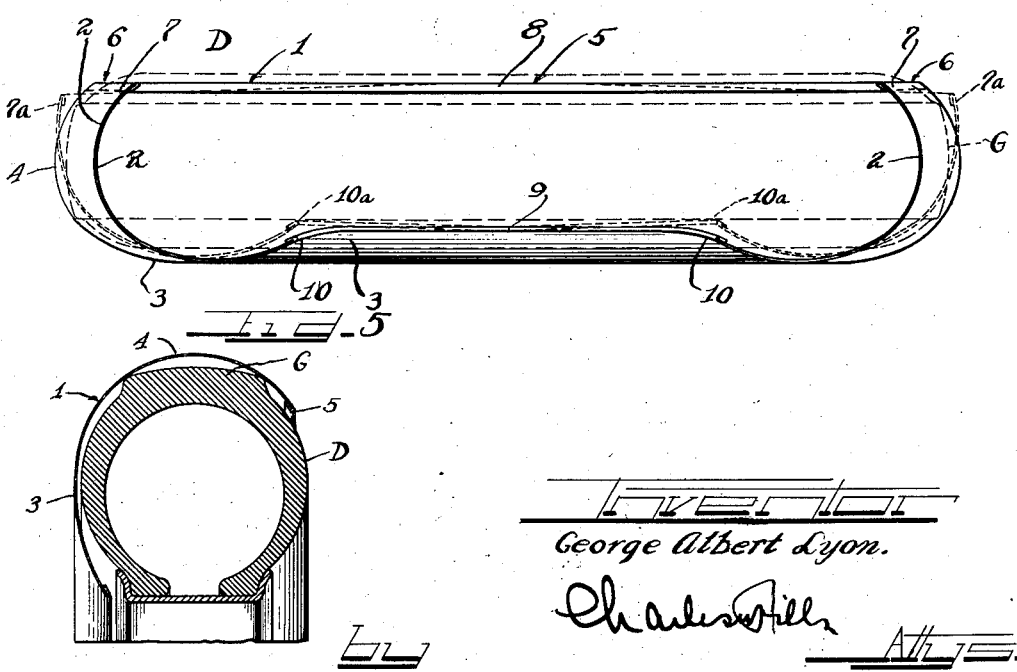

May 21, 1935.  G. A. LYON  2,001,969
ONE-PIECE ARCUATE TIRE COVER
Filed Jan. 2, 1932    3 Sheets-Sheet 3
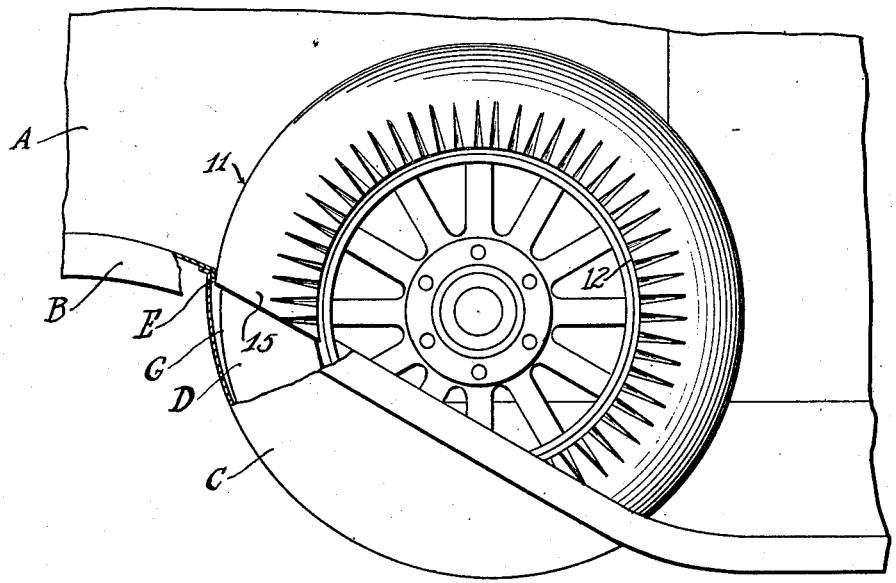
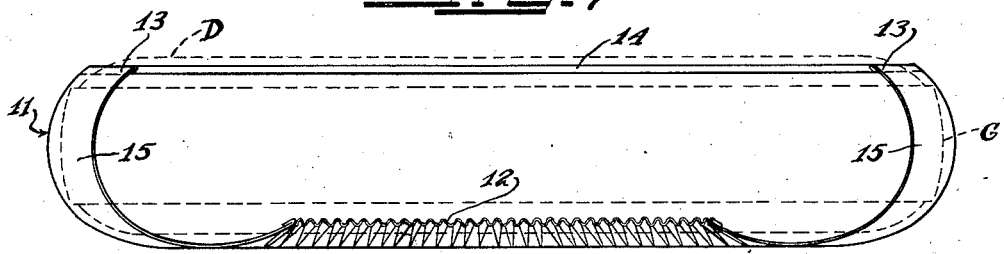
Inventor
George Albert Lyon.
by
Atty's.

Patented May 21, 1935

2,001,969

UNITED STATES PATENT OFFICE 2,001,969

ONE PIECE ARCUATE TIRE COVER

George Albert Lyon, Allenhurst, N. J., assignor to Lyon Incorporated, Asbury Park, N. J., a corporation of Delaware Application January 2, 1932, Serial No. 584,557

11 Claims. (Cl. 150—54)

This invention relates to tire covers for spare tires and particularly to the protection and concealment of exposed portions of spare tires carried in automobile fender wells and the like.

It is one of the objects of this invention to provide a shove-on tire cover of this character which may be readily applied to and removed from a spare tire in a single operation or movement of the cover.

It is a further object of the invention to provide a cover of this character which comprises a single piece of flexible material such as sheet metal which will hold itself by its own resiliency on a tire and yet will permit of its being flexed to allow removal from a tire.

It is another object of this invention to provide a unitary tire cover for cooperation with the fender well of an automobile for properly concealing and protecting a spare tire, the cover being of extremely simple construction and neat appearance, and involving a low cost of manufacture.

Further objects of the invention will appear as the description proceeds.

In accordance with the general features of the invention, the tire cover comprises a shell having a circumferential extent sufficient to properly protect portions of a tire carried in a fender well and comprising side wall and tread covering portions preferably having a transverse and longitudinal shape corresponding to that of the tire itself. The cover is of preferably resilient material so that it may be flexed to allow the same to be readily applied to and removed from the tire, no great amount of effort being required to exert the desired force.

In accordance with one form of the invention, the free marginal portion of the inner periphery of the cover is arranged to yield transversely in response to flexure of the other margin to thereby facilitate such expansion of the cover as is necessary in its application to and removal from the tire.

In accordance with another form of the invention, the inner peripheral margin of the cover is corrugated to permit of its expansion and contraction so that with this construction the cover is easily applicable to and removable from a spare tire with a minimum of effort.

Other and further important objects of this invention will be apparent from the disclosures in the specification and the accompanying drawings.

This invention (in a preferred form) is illustrated in the drawings and hereinafter more fully described.

Figure 1 is a fragmentary elevational view, partly broken away, of an automobile body provided with a fender well for a spare tire and showing a tire cover constructed in accordance with the present invention in tire protecting position.

Figures 2 and 3 are rear elevational views showing the manner in which the cover of Figure 1 is applied to and removed from a spare tire.

Figure 4 is a bottom view, somewhat enlarged, of Figure 3.

Figure 5 is a transverse sectional view taken approximately in the plane indicated by the line V—V in Figure 1.

Figure 6 is a view similar to Figure 1 but showing a modified form of the invention.

Figure 7 is a reversed bottom view, somewhat enlarged, of the tire cover of Figure 6, the spare tire being shown in dotted lines.

Referring now more particularly to the drawings, wherein the same parts are designated throughout by the same reference characters, the automobile body A is shown as being provided with a fender B having a well C in which a spare tire D is received. For the purpose of protecting portions of the tire D projecting above the well C, as well as to enhance the appearance of the automobile in connection with which it is used, a tire cover having a cross-sectional shape conforming to that of the spare tire D and of such circumferential extent that, when in proper tire protecting position, its ends 2 terminate at the mouth E of the well, is provided.

In accordance with the form of the invention appearing in Figures 1 to 5, inclusive, the tire cover comprises a transversely and longitudinally flexible, preferably sheet metal, arcuate member 1 having a side portion 3 for covering the exposed portion of one side wall F of the spare tire D and a rim or tread covering portion 4 for covering the exposed portion of the tire tread G. The resilient property of the material of which the cover 1 is made permits of a sufficient flexure of the same to allow it to be readily applied to and removed from a spare tire, and of resiliently retaining the cover on the tire when in proper tire protecting position.

The normal diameter of the tread covering portion 4 of the cover 1 is less than the diameter of the tread G of the spare tire D. Moreover, the marginal portion 5 of the rim part 4 projects radially inwardly of the tread G of the tire D when the cover is on the tire, and is in addition so arranged that it is somewhat spaced from the tire as shown at 6. The space 6 is such as to allow one or more fingers of the hand to be inserted therein so that the ends 7 of the margin 5 may be grasped and flexed apart to occupy substantially the positions shown at 7a in dotted lines in Figures 3 and 4. When occupying the positions 7a, the ends 7 of the margin 5 are able to clear the tread G of the tire. It will be found, however, that upon so flexing the ends 7 the intermediate portion 8 of the margin 5 is drawn inwardly through the space 6 to a position shown at 8a in Figure 3.

It will also be observed that, because of the movement of the ends 7, a distortion of the inner peripheral margin 9 occurs. In response to the outward movement of the ends 7 of the margin 5, the ends 10 of the margin 9 are flexed toward the plane of the rim 4 to the positions shown in dotted lines 10a in Figure 4.

In order to avoid contact between the ends 10 and the wheel upon which the spare tire is mounted, or to prevent resistance to the yielding of the ends 10, said ends are normally bent outwardly as shown in full lines in Figure 4.

In removing the cover 1 from the spare tire D, it is thus necessary first to spread the ends 7 to the positions 7a and then raise the tire a slight amount, just sufficient to cause the intermediate marginal portion 8, occupying the position 8a, to clear the tread G of the tire, whereupon the cover may be withdrawn transversely from the tire. In applying the cover to the tire, the same operation is necessary with a reverse movement as will be understood.

It will be seen from the foregoing that the form of tire cover herein described is readily applicable to and removable from a tire with substantially one movement in each case, the material of which the cover is made being of sufficient resilience to allow the same to be flexed with but slight exertion on the part of the person using the same, and yet sufficient to grip the tire with adequate pressure when the cover is in proper tire protecting position to resist accidental removal therefrom. The cover, moreover, presents a very neat appearance, is extremely simple since it is of one piece construction, the absence of attaching instrumentalities serving, in addition to simplification of the structure, to enhance the appearance of the cover and the car in connection with which it is used.

When in use, the cover occupies substantially the position shown in Figure 3 with respect to the spare tire, and is of such circumferential length that its ends 2 terminate at the mouth E of the well B as hereinabove stated, and preferably project somewhat into the well as shown in Figure 1, thereby giving the appearance of a cover which is a part of the fender B or well C. Suitable anti-rattling means may be provided at the mouth of the well for engagement with the ends 2 of the cover.

While the central portion of the cover need be spaced from the tire tread only by the distance by which the margin thereof extends radially inward, it may be more feasible, in view of the proximity of the fender when the tire is in the well, to first hold the cover in a somewhat raised position before applying or removing the same, as shown in Figure 2.

In accordance with the form of the invention appearing in Figures 6 and 7, the cover 11 is substantially identical with that previously described with the exception of the inner peripheral margin 12, which is corrugated for the purpose of flexibility. Thus, when the ends 13 of the outer margin 14 are flexed in the manner shown and described in connection with the ends 7 of the margin 8 of the previously described form of the invention, the consequent stress upon the inner peripheral margin 12 results in a flexure of the margin 12, and this flexure or distortion will be in a direction substantially parallel to the margin 12, whereby the adequate spreading of the ends 13 to clear the tread G of the spare tire D may be accomplished with slight effort.

The application and removal of the cover 11 with respect to the spare tire is accomplished in the same manner in which the same is accomplished in connection with the tire 1, and it is constructed to fit the tire and the mouth of the well in substantially the same way, suitable anti-rattling means being provided if desired for the the ends 15 of the cover 11.

In addition to facilitating application and removal of the tire cover, the corrugated margin 12 materially enhances the appearance of the cover and the car in connection with which it is used, and yet may be formed at slight cost.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with an automobile fender well carrying a spare tire, a cover for the tire comprising a single piece of sheet metal of arcuate form corresponding with that of a tire, and of a circumferential extent in excess of 180° and substantially less than 360°, said piece comprising a side portion and a rim portion for covering portions of a side wall and the tread of the tire, the free margin of the rim portion extending radially inward of the tire tread and being resilient whereby the same may be flexed outwardly to clear the tread and permit ready application and removal of the cover with a substantially transverse movement of the cover in each case, the ends of said piece terminating at the mouth of the well, the rim portion being resilient and having a normal diameter which is less than the diameter of the tire at its tread, whereby said piece holds itself firmly on the tire when in proper tire protecting position.

2. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, said margin, when on the tire, being spaced therefrom sufficiently to enable said margin to be grasped by the fingers for the purpose of flexing the same.

3. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, the margin of the side portion of the cover being freely yieldable in response to flexure of the other margin, whereby said other margin may be flexed with a minimum of effort.

4. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, the margin of the side portion of the cover being spaced from the tire when in proper tire protecting position sufficiently to enable the same to yield freely upon flexing of the other margin.

5. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, the margin of the side portion of the cover being longitudinally expansible and contractible in response to yielding movements of the other margin.

6. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, the margin of the side portion of the cover being transversely yieldable in response to yielding movements of the rim margin.

7. A tire cover comprising a single piece of sheet metal of arcuate form of between 180° and 360° in extent, comprising side and rim portions for covering side wall and tread portions of an automobile spare tire, the margin of the rim portion normally extending radially inwardly of the tread of the tire when in proper tire protecting position and being resilient whereby the same may be flexed to clear the tread to allow the cover to be applied to and removed from the tire, the margin of the side portion of the cover being corrugated and thus longitudinally expansible and contractible in response to yielding movements of the other margin.

8. A cover for a spare tire of an automobile comprising a resilient sheet metal piece of arcuate form and having a circumferential extent of between 180° and 360°, said piece having a normal diameter which is less than that of the tire to be covered thereby, to thereby firmly hold the cover in proper tire protecting position on the tire, said piece being constructed and arranged so that its ends are movable transversely of the piece about the intermediate portion thereof by a pivotal action to clear the tire tread and thereby enable the cover to be removed from the tire with a substantially single movement transversely of the tire.

9. A cover for a spare tire of an automobile comprising a resilient sheet metal piece of arcuate form and having a circumferential extent of between 180° and 360°, said piece having a normal diameter which is less than that of the tire to be covered thereby, to thereby firmly hold the cover in proper tire protecting position on the tire, said piece being constructed and arranged so that its ends are movable radially and transversely of the piece about the intermediate portion thereof by a pivotal action to clear the tire tread and thereby enable the cover to be removed from the tire with a substantially single movement transversely of the tire.

10. In combination with an automobile fender well carrying a spare tire, a cover for the tire comprising a single piece of sheet metal of arcuate form corresponding with that of a tire, and of a circumferential extent in excess of 180° and substantially less than 360°, said piece comprising a side portion and a rim portion for covering portions of a side wall and the tread of the tire, the free margin of the rim portion extending radially inward of the tire tread and being resilient whereby the same may be flexed outwardly to clear the tread and permit ready application and removal of the cover with a substantially transverse movement of the cover in each case, the ends of said piece terminating at the mouth of the well, and means for preventing rattling between the cover and the well.

11. In combination with an automobile fender well carrying a spare tire, a cover for the tire comprising a single piece of sheet metal of arcuate form corresponding with that of a tire, and of a circumferential extent in excess of 180° and substantially less than 360°, said piece comprising a side portion and a rim portion for covering portions of a side wall and the tread of the tire, the free margin of the rim portion extending radially inward of the tire tread and being resilient whereby the same may be flexed outwardly to clear the tread and permit ready application and removal of the cover with a substantially transverse movement of the cover in each case, the ends of said piece terminating at the mouth of the well, the rim portion being resilient and having a normal diameter which is less than the diameter of the tire at its tread, whereby said piece holds itself firmly on the tire when in proper tire protecting position, and means for preventing rattling between the cover and the well.

GEORGE ALBERT LYON.